US012549889B2

(12) United States Patent
Chang et al.

(10) Patent No.: US 12,549,889 B2
(45) Date of Patent: Feb. 10, 2026

(54) SPEAKER MODULE

(71) Applicant: Acer Incorporated, New Taipei (TW)

(72) Inventors: Jia-Ren Chang, New Taipei (TW); Ruey-Ching Shyu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 242 days.

(21) Appl. No.: 18/302,196

(22) Filed: Apr. 18, 2023

(65) Prior Publication Data

US 2024/0171904 A1 May 23, 2024

(30) Foreign Application Priority Data

Nov. 18, 2022 (TW) ................................ 111144176

(51) Int. Cl.

*H04R 1/28* (2006.01)
*H04R 1/02* (2006.01)
*H04R 7/04* (2006.01)

(52) U.S. Cl.

CPC ............ *H04R 1/288* (2013.01); *H04R 1/025* (2013.01); *H04R 7/04* (2013.01); *H04R 1/028* (2013.01); *H04R 2499/15* (2013.01)

(58) Field of Classification Search

CPC ........ H04R 1/025; H04R 1/2823; H04R 1/02; H04R 1/28; H04R 1/2815; H04R 1/2819; H04R 1/2826; H04R 1/2834; H04R 1/2842; H04R 1/2876; H04R 1/2846;

(Continued)

(56) References Cited

U.S. PATENT DOCUMENTS 5,892,183 A 4/1999 Roozen et al.
7,051,835 B2 5/2006 Martikainen
9,820,033 B2 11/2017 Dix et al.

(Continued)

FOREIGN PATENT DOCUMENTS

CN 2578870 Y 10/2003
CN 113810801 A 12/2021

(Continued)

OTHER PUBLICATIONS

Extended European Search Report dated Oct. 2, 2023, issued in application No. EP 23169329.2.

(Continued)

*Primary Examiner* — Ahmad F. Matar
*Assistant Examiner* — Sabrina Diaz
(74) *Attorney, Agent, or Firm* — McClure, Qualey & Rodack, LLP

(57) ABSTRACT

A speaker module includes a casing, a speaker unit and a loop tube. The speaker unit has a sound cavity, a first sound outlet and a second sound outlet. The speaker unit is disposed in the casing, and the speaker unit includes a diaphragm, and the diaphragm communicates with the first sound outlet. The loop tube is disposed in the casing, and the loop tube has a first end and a second end. The first end communicates with the sound cavity, and the second end communicates with the second sound outlet. The cross-sectional area of the second sound outlet and the loop tube is at least ten percent of the area of the diaphragm, and the ratio of the total length of the loop tube to the volume of the sound cavity is 2.5~7.5.

14 Claims, 10 Drawing Sheets

100B

(58) Field of Classification Search

CPC .... H04R 1/2838; H04R 1/288; H04R 1/2853; H04R 1/2865; H04R 2499/11; H04R 2499/15

USPC ......................... 381/345, 349, 350, 351, 354

See application file for complete search history.

(56) References Cited

U.S. PATENT DOCUMENTS

| | | | | |
|---|---|---|---|---|
| 2001/0037910 | A1 | 11/2001 | Coffin | |
| 2005/0145434 | A1 * | 7/2005 | Thorsell ............... | H04R 1/2826 181/156 |
| 2011/0255726 | A1 | 10/2011 | Yu et al. | |
| 2014/0291065 | A1 | 10/2014 | Kim | |
| 2017/0176330 | A1 | 6/2017 | Lahti et al. | |
| 2019/0141452 | A1 | 5/2019 | Chang | |
| 2021/0149457 | A1 | 5/2021 | Kapinos | |
| 2022/0337940 | A1 * | 10/2022 | Qin ...................... | H04R 1/2857 |

FOREIGN PATENT DOCUMENTS

| | | | | |
|---|---|---|---|---|
| EP | 0 641 142 | A1 | 3/1995 | |
| ES | 2 358 735 | T3 | 5/2011 | |
| GB | 2509711 | A | 7/2014 | |
| TW | M532126 | U | 11/2016 | |
| TW | 201919409 | A | 5/2019 | |
| WO | WO-2020125940 | A1 * | 6/2020 | ............. H04R 1/227 |
| WO | 2021243084 | A1 | 12/2021 | |

OTHER PUBLICATIONS

Doll, B.; "Maximizing Bass Reflex System Performance Through Optimization of Port Geometry;" Graduate Thesis; Jan. 2020; pp. 1-32.

Chinese language office action dated Oct. 11, 2023, issued in application No. TW 111144176.

European communication dated Nov. 14, 2025, issued in application No. EP 23169329.2.

* cited by examiner

SPEAKER MODULE

CROSS REFERENCE TO RELATED APPLICATIONS

This application claims the benefit of Taiwan Patent Application No. 111144176, filed 11 18, 2022, the entirety of which are incorporated by reference herein.

BACKGROUND OF THE INVENTION

Field of the Disclosure

The present disclosure relates to a speaker module, and in particular it relates to a speaker module capable of increasing the sound pressure level at low frequencies.

Description of the Related Art

As technology has developed, many of today's electronic devices (such as notebook computers) have become quite popular products. Notebook computers are among the most popular and widespread of today's consumer products. Users can execute various applications on notebook computers to achieve various purposes, such as watching videos, playing games, browsing the web, and reading e-books.

Generally speaking, electronic devices such as notebook computers are equipped with at least one speaker module configured to provide sound, including music. However, the design trends in the manufacturing of notebook computers shows that each successive generation of these products is becoming thinner and lighter, meaning that the size of the speaker module—as well as of the sound cavity inside the speaker module—must also be reduced. A sound cavity of insufficient volume will cause the speaker module to produce sound that is of insufficient quality to meet the user's needs, especially with low-frequency sound effects.

Therefore, how to design a speaker module that can improve the low-frequency effect is a topic nowadays that needs to be discussed.

BRIEF SUMMARY OF THE INVENTION

Accordingly, one objective of the present disclosure is to provide a speaker module to solve the above problems.

The present disclosure provides a speaker module that includes a casing, a speaker unit and a loop tube. The speaker unit has a sound cavity, a first sound outlet and a second sound outlet. The speaker unit is disposed in the casing, and the speaker unit includes a diaphragm, and the diaphragm communicates with the first sound outlet. The loop tube is disposed in the casing, and the loop tube has a first end and a second end. The first end communicates with the sound cavity, and the second end communicates with the second sound outlet. The cross-sectional area of the second sound outlet and the loop tube is at least ten percent of the area of the diaphragm, and the ratio of the total length of the loop tube to the volume of the sound cavity is 2.5~7.5.

According to some embodiments, the casing has a rectangular prism structure which includes a top wall, a front side wall and a side wall connected to each other, and the first sound outlet is formed by the top wall.

According to some embodiments, the loop tube is adjacent to the front side wall, and the loop tube has a uniform tubular structure extending along a long axis of the casing.

According to some embodiments, the second sound outlet is disposed on one of the top wall, the front side wall and the side wall, and the second end forms a connecting opening corresponding to the second sound outlet.

According to some embodiments, the loop tube has a uniform tubular structure and includes a first segment and a second segment, the first segment extends along a long axis of the casing, the second segment extends along a short axis of the casing, and the long axis is perpendicular to the short axis.

According to some embodiments, the first segment is adjacent to the front side wall, the second segment is adjacent to the side wall and the top wall, wherein the second sound outlet is disposed on the top wall or the side wall, and a connecting opening is formed on the second end of the second segment, corresponding to the second sound outlet.

According to some embodiments, the second sound outlet is disposed on the top wall, and the speaker module includes an acoustic porous element disposed on the second sound outlet.

According to some embodiments, the acoustic porous element is a mesh which is attached on the top wall.

According to some embodiments, the casing further includes a rear side wall connected to the top wall and the side wall, the first segment is adjacent to the front side wall, the second segment is adjacent to the side wall, the top wall and the rear side wall, wherein the second sound outlet is disposed on one of the top wall, the rear side wall and the side wall, and a connecting opening is formed on the second end of the second segment, corresponding to the second sound outlet.

According to some embodiments, the volume of the sound cavity is 4 c.c. to 8 c.c., the total length of the loop tube is 20 to 30 mm, and the cross-sectional area of the loop tube is 10 to 12 $mm^2$.

According to some embodiments, the volume of the sound cavity is 4 c.c. to 8 c.c., the total length of the loop tube is 20 to 30 mm, and the cross-sectional area of the loop tube is 10 to 20 $mm^2$.

According to some embodiments, the speaker module further includes an acoustic porous element disposed in the second sound outlet.

According to some embodiments, the acoustic porous element is an adjustment unit disposed in the loop tube, and the acoustic porous element is disposed adjacent to the second sound outlet.

According to some embodiments, the distance between the acoustic porous element and the second sound outlet is ten to twenty percent of the total length of the loop tube.

According to some embodiments, the acoustic porous element is made of a material having sound-absorbing properties, which is made of PU foam, PE foam, special rubber foam, melamine cotton, glass fiber cotton, rock wool, OFAN polyester fiber sound-absorbing cotton, melamine sound-absorbing cotton, activated carbon, or a combination thereof.

The present disclosure provides a speaker module, including a casing, a speaker unit and a loop tube. The speaker unit has a sound cavity, a first sound outlet and a second sound outlet. The speaker unit is disposed in the casing, and the speaker unit includes a diaphragm, and the diaphragm communicates with the first sound outlet. The loop tube is disposed in the casing and has a first end and a second end. The first end communicates with the sound cavity, and the second end is connected to the second sound outlet. When the diaphragm vibrates, the sound emitted by the second sound outlet and the sound emitted by the first sound outlet will add to each other, thereby enhancing the bass effect of the speaker module.

Compared with the conventional speaker module, the speaker module of the present disclosure increases the cross-sectional area of the second sound outlet (for example, 10 to 20 $mm^2$), so that the sound pressure level and impedance at low frequencies can be improved. Furthermore, the cross-sectional areas of the second sound outlet and the loop tube in the present disclosure are designed to be more than ten percent of the area of the diaphragm. Based on this design, it can not only increase the sound pressure level at low frequencies, but also effectively reduce the wind noise of the speaker module.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
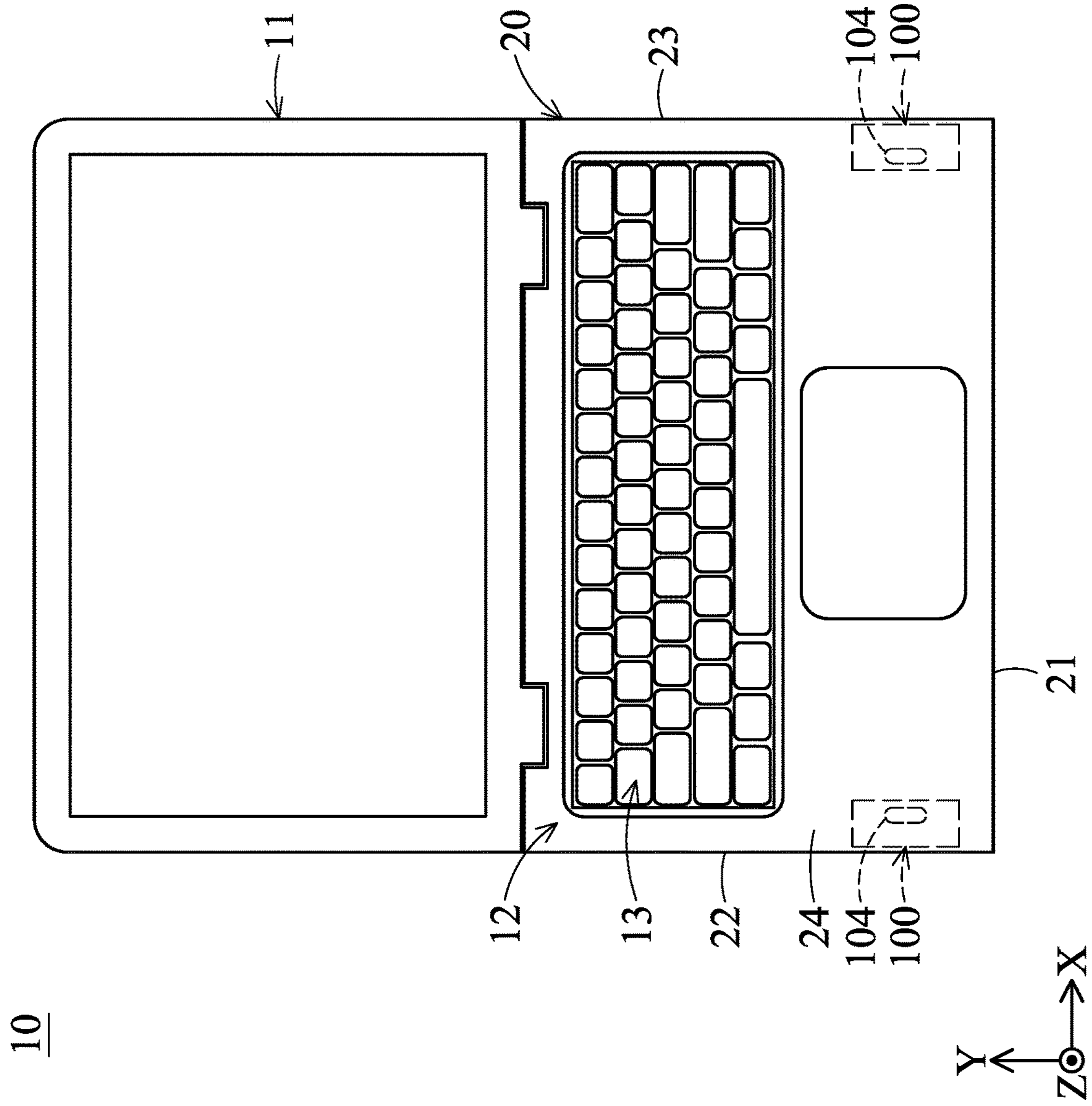
FIG. 1 is a schematic diagram of an electronic device 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, “vertical,” “above,” “over,” “below,”, “bottom,” etc. as well as derivatives thereof (e.g., “downwardly,” “upwardly,” etc.) are used in the present disclosure for ease of description of one feature’s relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as “first”, “second”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as “connected” and “interconnected”, refer to a relationship wherein structures are secured or attached to one another either directly or indirectly through intervening structures, as well as both movable or rigid attachments or relationships, unless expressly described otherwise.

Please refer to FIG. 1, which is a schematic diagram of an electronic device 10 according to an embodiment of the present disclosure. The electronic device 10 is, for example, a notebook computer with a display module 11 and a host module 12. The host module 12 is connected to the display module 11, and the host module 12 may include a keyboard 13, a housing 20 and two speaker modules 100. The speaker modules 100 can be disposed adjacent to at least one of a front side 21, a left side 22, a right side 23 and a top surface 24 of the housing 20.

In this embodiment, as shown in FIG. 1, the two speaker modules 100 are respectively disposed adjacent to the left side 22 and the right side 23, but they are not limited thereto. Furthermore, the speaker module 100 includes a speaker unit 104 configured to convert current signals into audio signals.

Figure 2:
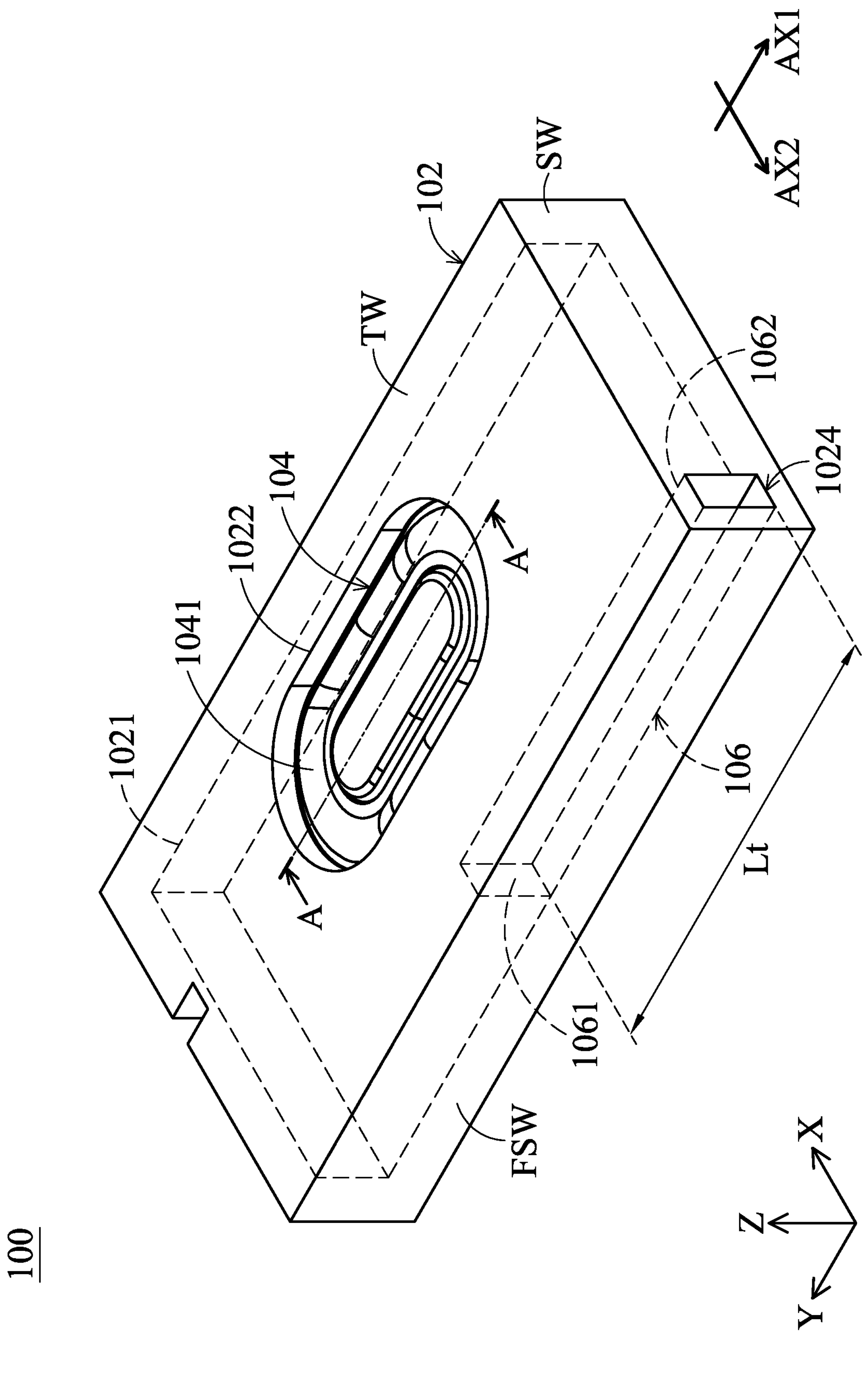
FIG. 2 is a perspective view of the speaker module 100 according to an embodiment of the disclosure.
Figure 3:
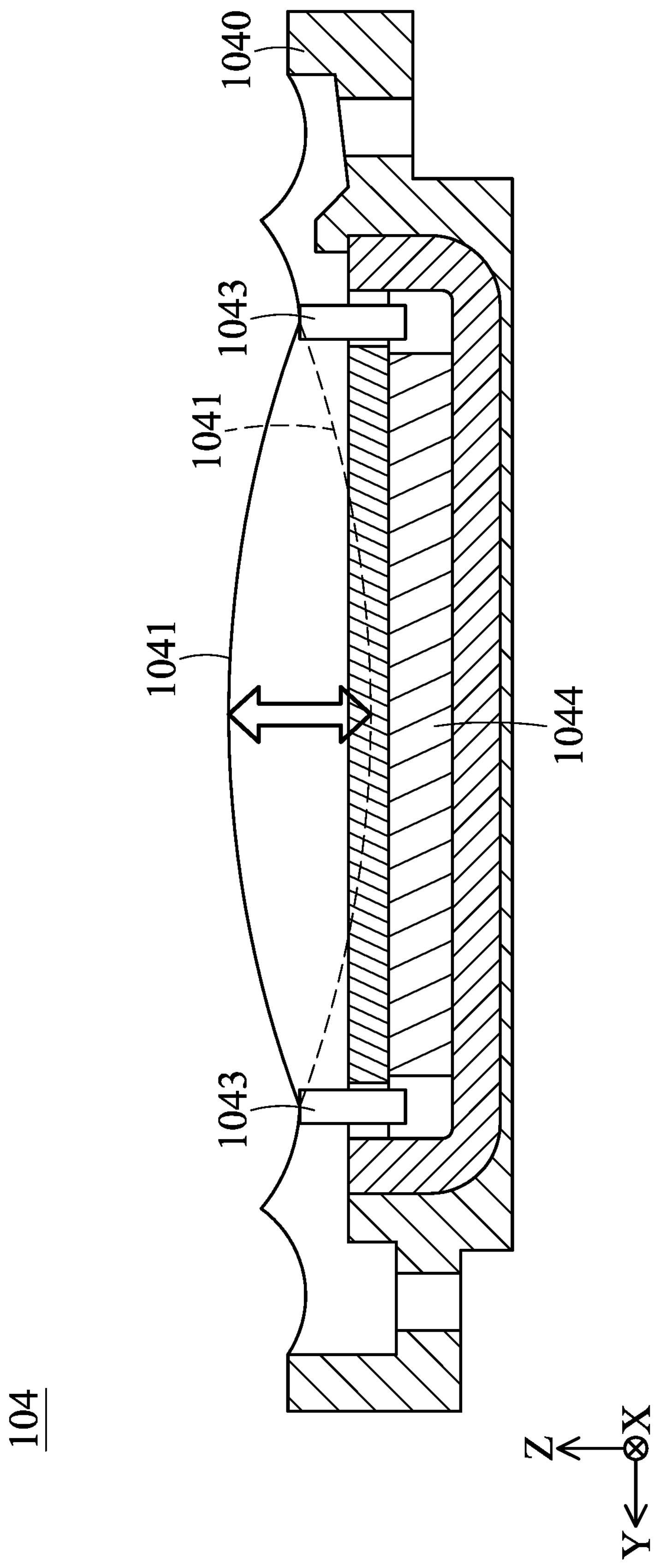
FIG. 3 is a cross-sectional view of the speaker module 100 along the line A-A in FIG. 2 according to an embodiment of the present disclosure.

Next, please refer to FIG. 2 and FIG. 3. FIG. 2 is a perspective view of the speaker module 100 according to an embodiment of the disclosure, and FIG. 3 is a cross-sectional view of the speaker module 100 along the line A-A in FIG. 2 according to an embodiment of the present disclosure. In this embodiment, the speaker module 100 includes a casing 102, the aforementioned speaker unit 104 and a loop tube 106.

The casing 102 may have a sound cavity 1021, a first sound outlet 1022 and a second sound outlet 1024, and the speaker unit 104 is disposed in the casing 102 and communicated with the sound cavity 1021. The speaker unit 104 includes a diaphragm 1041, and the diaphragm 1041 communicates with the first sound outlet 1022.

As shown in FIG. 3, the speaker unit 104 may further include a frame 1040, a coil 1043 and a magnet 1044. The frame 1040 is affixed to the casing 102, and the magnet 1044 is fixedly disposed on the frame 1040. Furthermore, the coil 1043 is fixedly connected to the bottom of the diaphragm 1041, and the diaphragm 1041 is movably connected to the frame 1040 and suspended above the magnet 1044.

When the coil 1043 is energized, it can act with the magnet 1044 to generate an electromagnetic driving force to drive the diaphragm 1041 to vibrate up and down along the Z-axis, so that the current signal is converted into an audio signal.

In this embodiment, the speaker module 100 is disposed in an ultra-thin notebook computer or an gaming notebook computer, so the volume of the sound cavity 1021 is relatively small, such as 4 c.c. to 8 c.c. Therefore, in order to enhance the low-frequency sound output effect of the speaker module 100, the present disclosure arranges the loop tube 106 in the casing 102.

The casing 102 has a rectangular prism structure, but it is not limited thereto, and it may have different shapes in other embodiments. The casing 102 includes a top wall TW, a front side wall FSW and a side wall SW connected to each other, and the first sound outlet 1022 is formed by the top wall TW. The loop tube 106 is adjacent to the front side wall FSW and the side wall SW, and the loop tube 106 has a uniform tubular structure which extends along a long axis AX1 of the casing 102.

As shown in FIG. 2, the loop tube 106 has a first end 1061 and a second end 1062, the first end 1061 communicates with the sound cavity 1021, and the second end 1062 communicates with the second sound outlet 1024.

In this embodiment, the second sound outlet 1024 is disposed on the side wall SW, but it is not limited thereto. In other embodiments, the second sound outlet 1024 can be disposed on the top wall TW or the front side wall FSW.

The total length Lt of the loop tube 106 may be 20 to 30 mm, and the cross-sectional area of the loop tube 106 may be 5 to 20 $mm^2$. In this embodiment, the total length Lt of the loop tube 106 is 20 to 30 mm, and the cross-sectional area of the loop tube 106 is 10 to 20 $mm^2$. Preferably, the cross-sectional area of the loop tube 106 is 10 to 12 $mm^2$.

In addition, the second sound outlet 1024 has the same cross-sectional area as the loop tube 106, which can be more than ten percent of the area of the diaphragm 1041, and the ratio of the total length Lt of the loop tube 106 to the volume of the sound cavity 1021 is 2.5 to 7.5. In some embodiments, the ratio of the total length Lt of the loop tube 106 to the volume of the sound cavity 1021 is 5 to 7.5. In other embodiments, the ratio of the total length Lt of the loop tube 106 to the volume of the sound cavity 1021 is 3.75 to 7.5.

Figure 4:
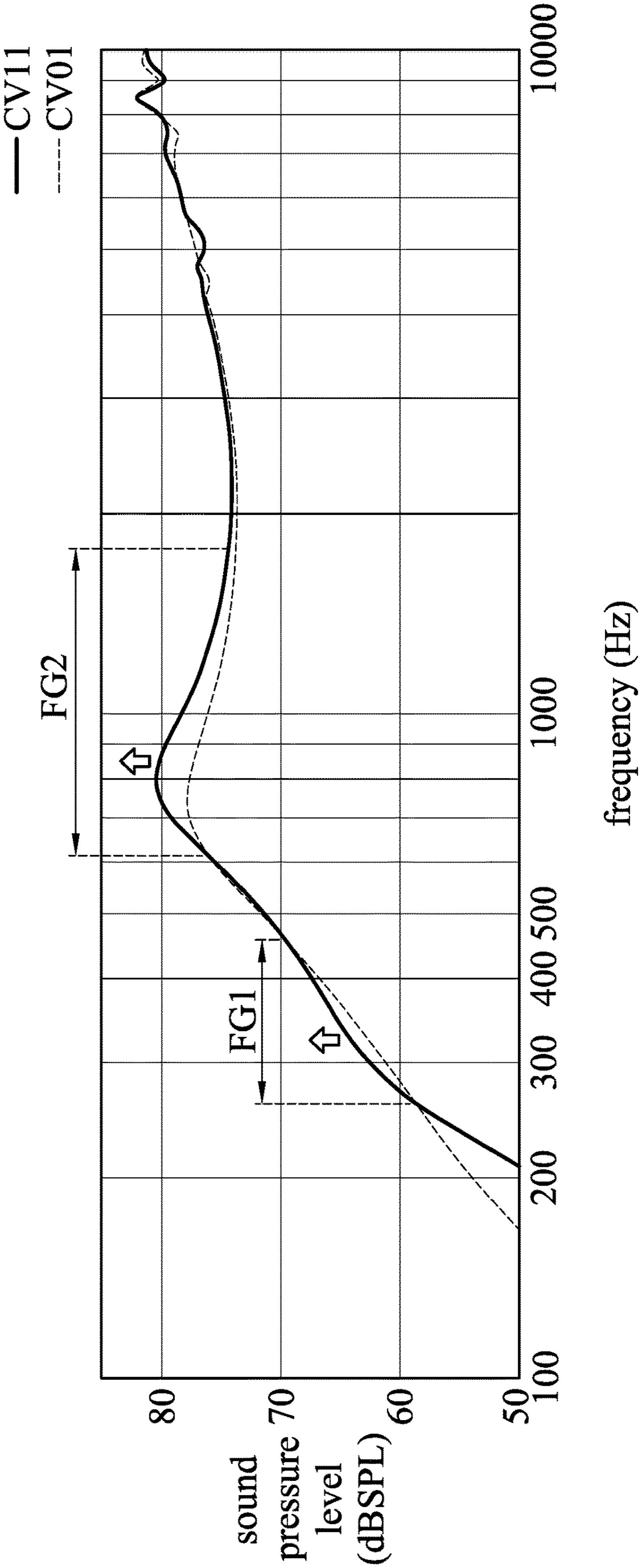
FIG. 4 is a chart illustrating the relationship between frequency and sound pressure level of the speaker module 100 of an embodiment of the present disclosure and a conventional speaker module.

Based on the design of the loop tube 106, the second sound outlet 1024 and the diaphragm 1041 of this embodiment, the sound sent by the second sound outlet 1024 can be added to the sound sent by the first sound outlet 1022, thereby enhancing the bass effect of the speaker module 100. Specifically, please refer to FIG. 4 and FIG. 5. FIG. 4 is a chart illustrating the relationship between frequency and sound pressure level of the speaker module 100 of an embodiment of the present disclosure and a conventional speaker module, and FIG. 5 is a chart illustrating the relationship between frequency and impedance of the speaker module 100 of an embodiment of the present disclosure and the conventional speaker module.

In FIG. 4, the curve CV01 represents the sound pressure level curves of the conventional speaker module at different frequencies, and the curve CV11 represents the sound pressure level curves of the speaker module 100 of the present disclosure at different frequencies. As shown in FIG. 4, compared with the curve CV01, the sound pressure level (dBSPL) of the curve CV11 at the first frequency band FG1 (250~430 Hz) and the second frequency band FG2 (620~1.6 kHz) can be increased by at least 3 dB.

Figure 5:
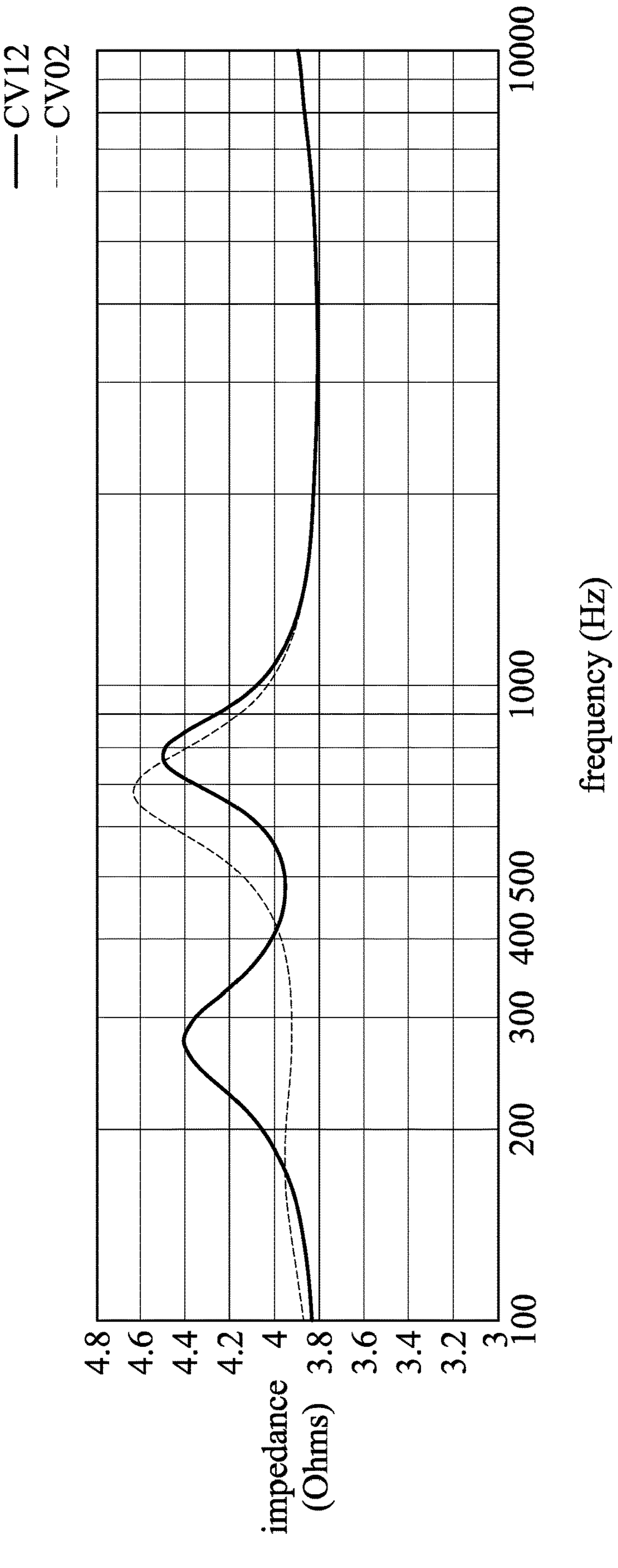
FIG. 5 is a chart illustrating the relationship between frequency and impedance of the speaker module 100 of an embodiment of the present disclosure and the conventional speaker module.

In addition, in FIG. 5, the curve CV02 represents the impedance curve of the conventional speaker module at different frequencies, and the curve CV12 represents the impedance curve of the speaker module of the present disclosure at different frequencies. As shown in FIG. 5, compared with the curve CV02, the impedance of the curve CV12 at low frequencies (250~430 Hz) is significantly improved, thereby improving the output capability of the speaker module 100 at low frequencies.

Figure 6:
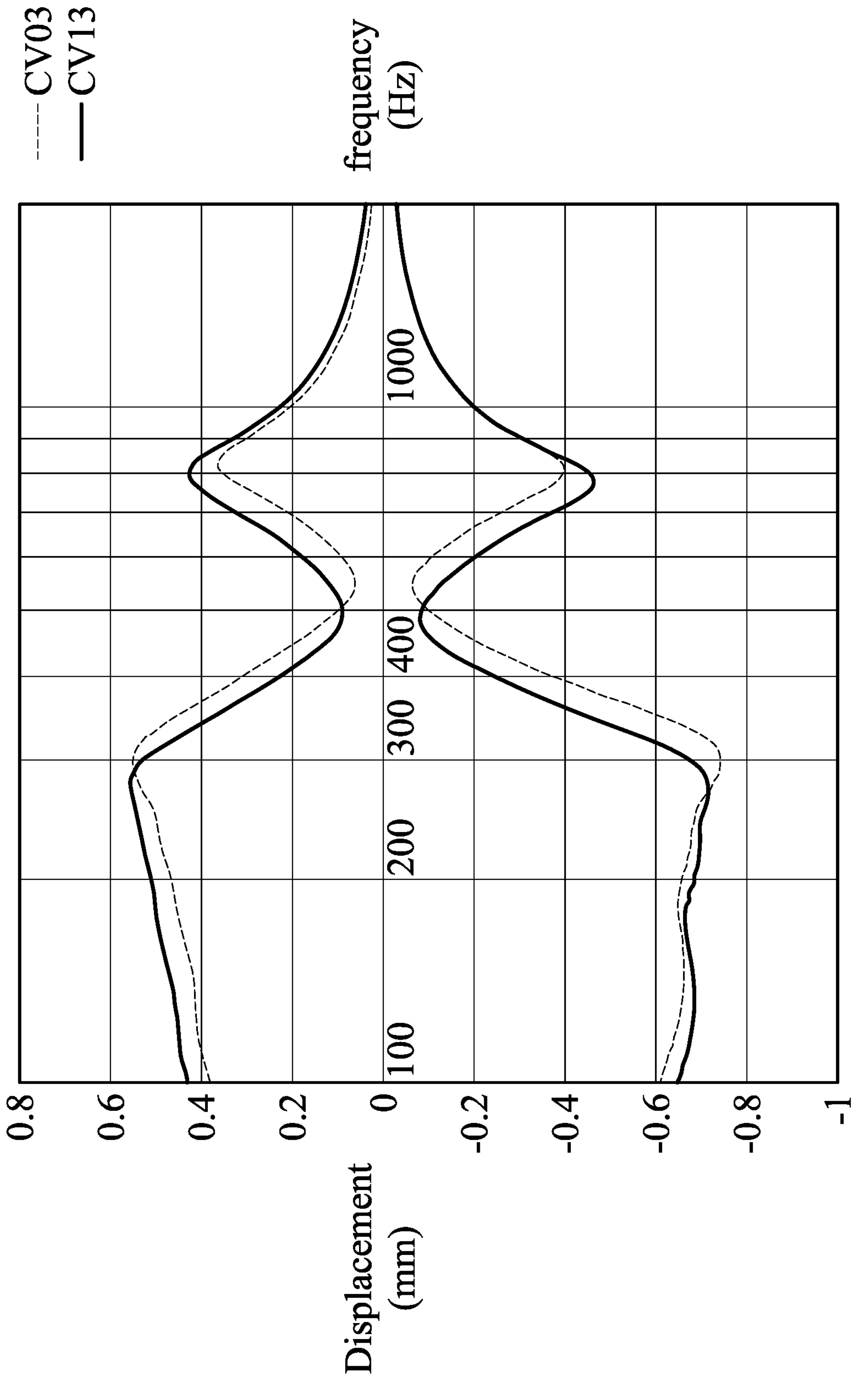
FIG. 6 is a chart illustrating the relationship between frequency and displacement of the speaker module 100 according to an embodiment of the present disclosure and the conventional speaker module.

Next, please refer to FIG. 3 and FIG. 6. FIG. 6 is a chart illustrating the relationship between frequency and displacement of the speaker module 100 according to an embodiment of the present disclosure and the conventional speaker module. In FIG. 6, the curve CV03 represents the displacement of the diaphragm of the conventional speaker module at different frequencies, and the curve CV13 represents the displacement of the diaphragm 1041 of the speaker module 100 of the present disclosure at different frequencies.

As shown in FIG. 6, compared to the conventional speaker module, the design of the present disclosure can reduce the downward displacement of the diaphragm 1041 at low frequencies (such as 250~350 Hz), so that the diaphragm 1041 in FIG. 3 is still not in contact with the magnet 1044 to generate unnecessary noise when the diaphragm 1041 vibrates downwards. Therefore, when the speaker module 100 of the present disclosure increases its output power at low frequencies, there will be no problem of the diaphragm 1041 colliding with the magnet 1044 to generate noise.

Figure 7:
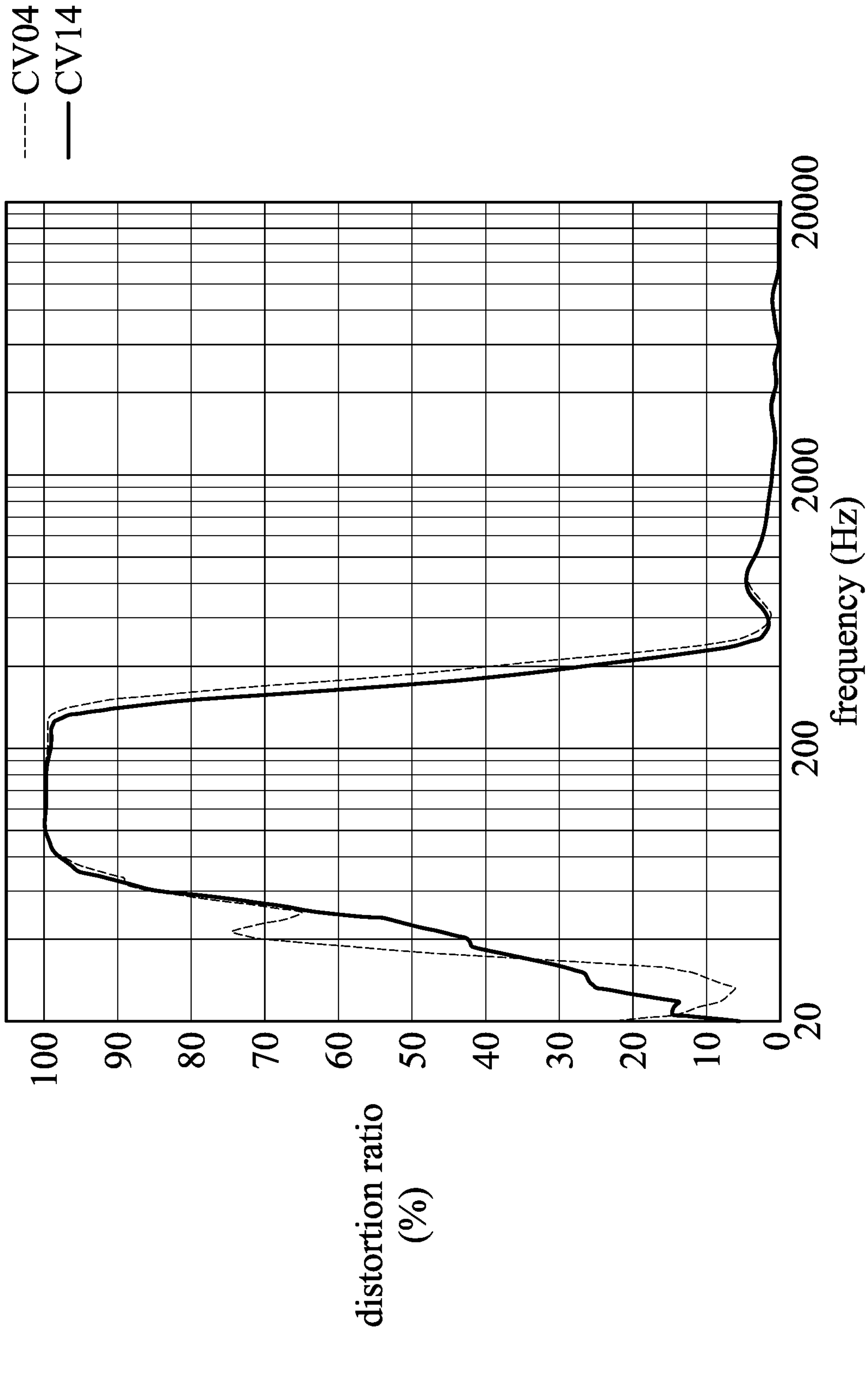
FIG. 7 is a chart illustrating the relationship between frequency and distortion ratio of the speaker module 100 according to an embodiment of the present disclosure and the conventional speaker module.

Next, please refer to FIG. 7. FIG. 7 is a chart illustrating the relationship between frequency and distortion ratio of the speaker module 100 according to an embodiment of the present disclosure and the conventional speaker module. In FIG. 7, the curve CV04 represents the distortion ratio of the conventional speaker module at different frequencies, and the curve CV14 represents the distortion ratio of the speaker module 100 of the present disclosure at different frequencies.

As shown in FIG. 7, compared with the conventional speaker module, at low frequencies (such 200~400 Hz), the distortion ratio of the speaker module 100 of the present disclosure is significantly reduced. That is to say, the speaker module 100 of the present disclosure can provide a clearer sound output effect at low frequencies. Another thing to note is that because the sound below 200 Hz is inaudible to the human ear, the distortion below 200 Hz can be ignored.

Figure 8:
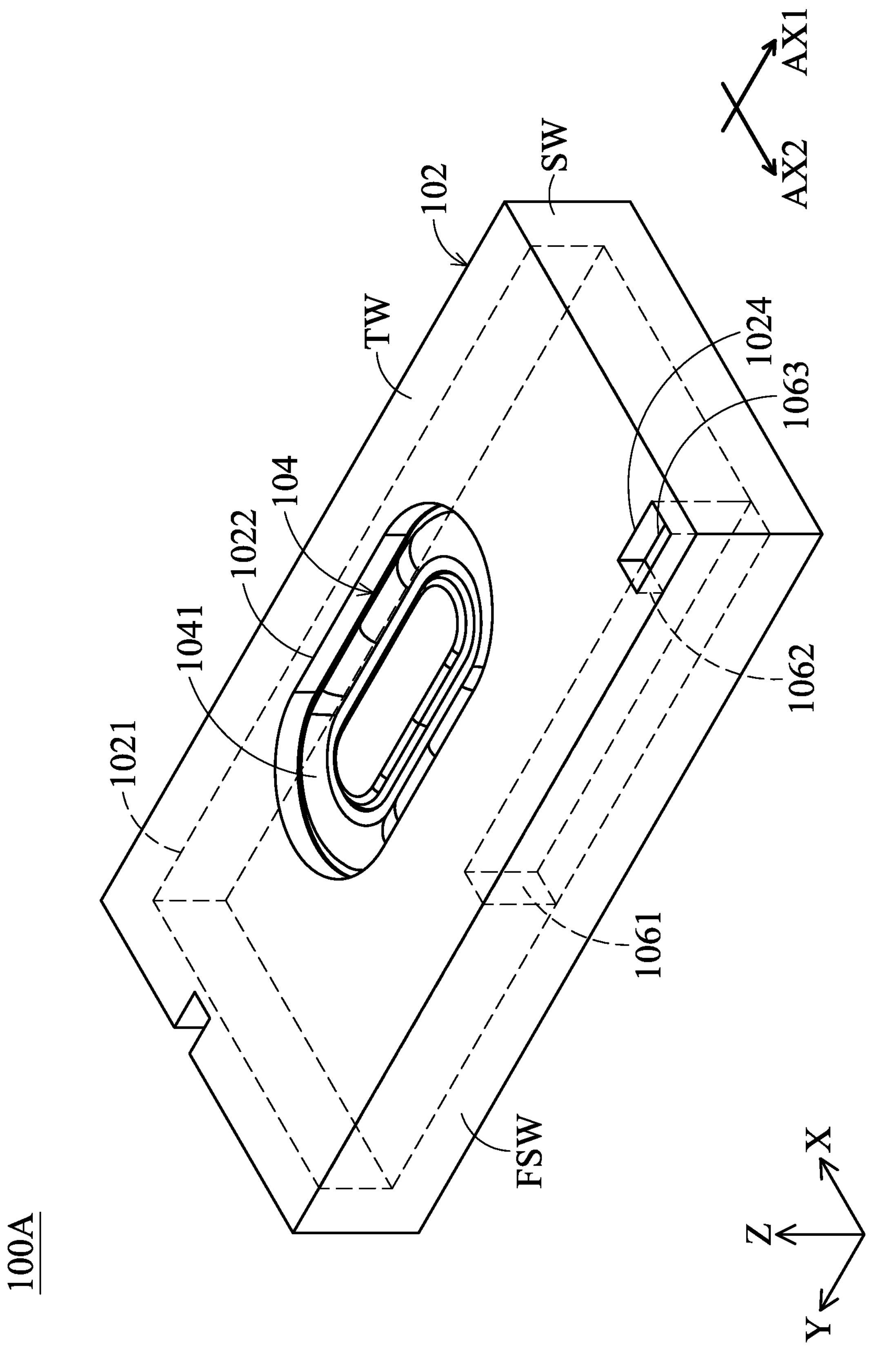
FIG. 8 is a three-dimensional schematic diagram of a speaker module 100A according to another embodiment of the present disclosure.

Please refer to FIG. 8, which is a three-dimensional schematic diagram of a speaker module 100A according to another embodiment of the present disclosure. Compared with the second sound outlet 1024 of the speaker module 100 being disposed on the side wall SW, the second sound outlet 1024 of the speaker module 100A in the embodiment is disposed on the top wall TW, and the second end 1062 forms a connecting opening 1063, corresponding to and communicated with the second sound outlet 1024. Such the configuration can have the same sound output effect as the aforementioned embodiment.

That is, the speaker module can adjust the position of the second sound outlet 1024 in response to the sound opening of the housing 20 (not shown in the figures), so as to achieve the best output effect. In this embodiment, the sound opening of the housing 20 is disposed on the top surface 24, and the second sound outlet 1024 is aligned with the sound opening of the housing 20. In addition, in other embodiments, when the sound opening of the housing 20 is disposed on the left side 22, the second sound outlet 1024 can also be disposed on the front side wall FSW.

Figure 9:
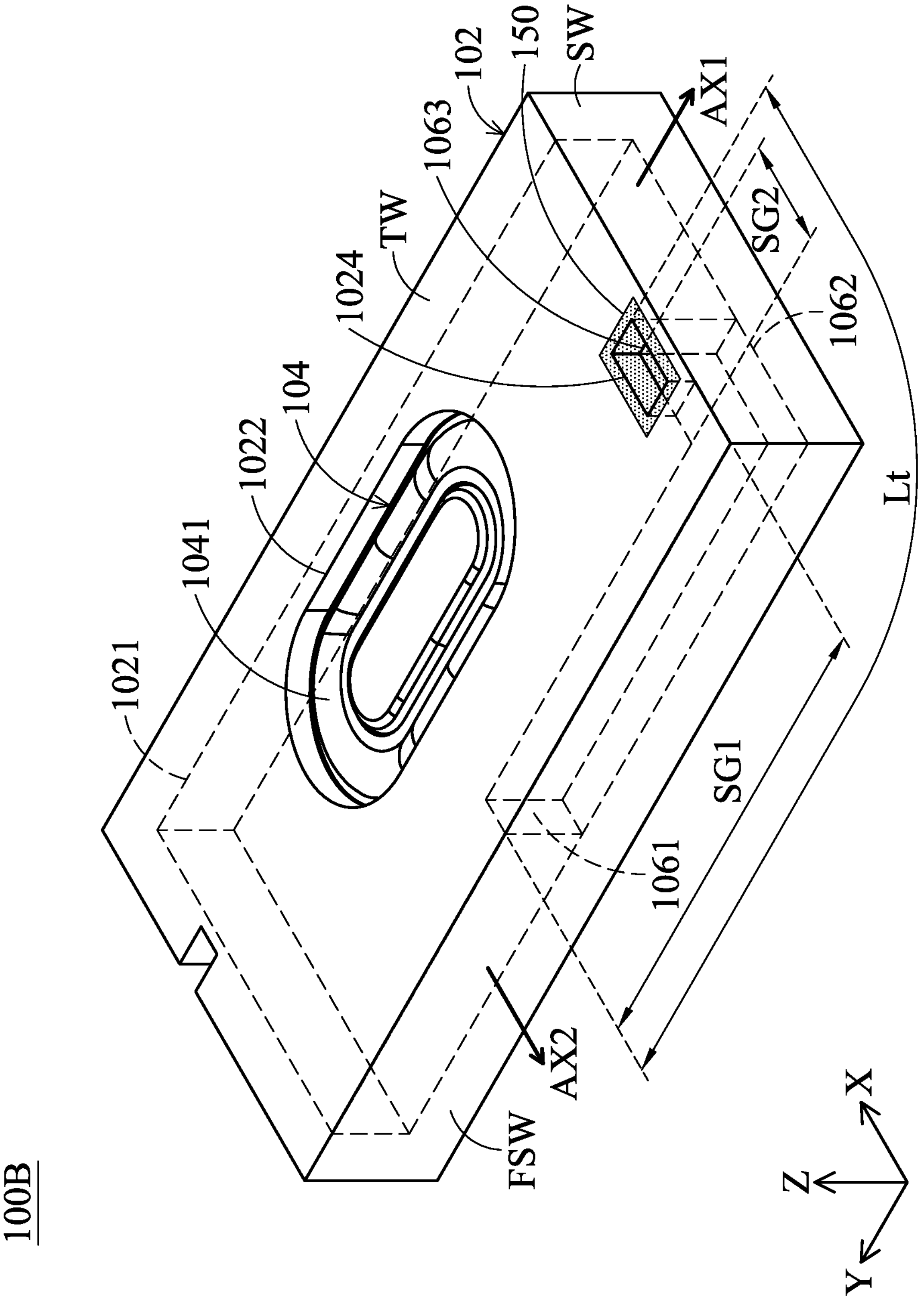
FIG. 9 is a three-dimensional schematic diagram of a speaker module 100B according to another embodiment of the present disclosure.

Please refer to FIG. 9, which is a three-dimensional schematic diagram of a speaker module 100B according to another embodiment of the present disclosure. In this embodiment, the loop tube 106 has a uniform tubular structure and can be L-shaped, which includes a first segment SG1 and a second segment SG2. The first segment SG1 extends along the long axis AX1, the second segment SG2 extends along a short axis AX2 of the casing 102, and the long axis AX1 is perpendicular to the short axis AX2.

The first segment SG1 is adjacent to the front side wall FSW, and the second segment SG2 is adjacent to the side wall SW and top wall TW. The second sound outlet 1024 is disposed on the top wall TW, and a connecting opening 1063 is formed on the second end 1062 on the second segment SG2, corresponding to the second sound outlet 1024. Similarly, in other embodiments, the second sound outlet 1024 can also be disposed on the side wall SW.

In addition, the speaker module 100B may further include an acoustic porous element 150 disposed on the second sound outlet 1024. In this embodiment, the acoustic porous element 150 can be a mesh, which is attached on the top wall TW.

In this embodiment, the total length Lt of the loop tube 106 may be 30 mm, and the cross-sectional area of the second sound outlet 1024 is 10~20 $mm^2$, preferably 15~20 $mm^2$. Such configuration can also be combined with the acoustic porous element 150 to achieve the effect of increasing the sound pressure level (dB SPL), and there will be no noise caused by the aforementioned diaphragm 1041 colliding with the magnet 1044.

Figure 10:
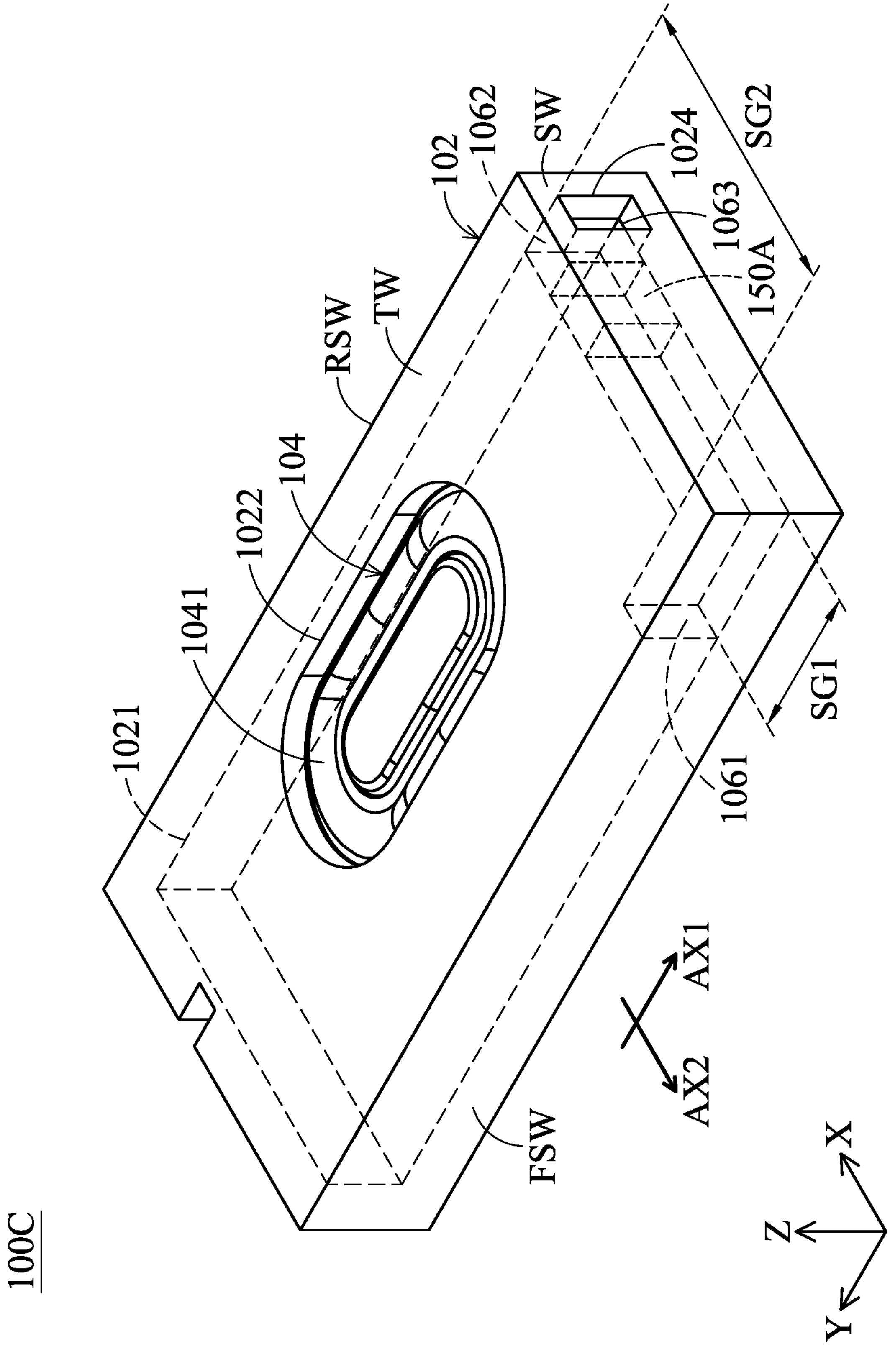
FIG. 10 is a three-dimensional schematic diagram of a speaker module 100C according to another embodiment of the present disclosure.

Please refer to FIG. 10. FIG. 10 is a three-dimensional schematic diagram of a speaker module 100C according to another embodiment of the present disclosure. In this embodiment, the casing 102 further includes a rear side wall RSW connected to the top wall TW and the side wall SW. Furthermore, the length of the first segment SG1 in this embodiment is smaller than the length of the second segment SG2.

Specifically, the first segment SG1 is adjacent to the front side wall FSW, and the second segment SG2 is adjacent to the side wall SW, the top wall TW and the rear side wall RSW. The second sound outlet 1024 is disposed on the side wall SW, and a connecting opening 1063 is formed on the second end 1062 of the second segment SG2, corresponding to the second sound outlet 1024.

Similarly, in other embodiments, the second sound outlet 1024 can also be disposed on the top wall TW or the rear side wall RSW. For example, the speaker module 100C can be disposed on the right side in FIG. 1 and adjacent to the right side 23 of the housing 20, and the second sound outlet 1024 disposed on the rear side wall RSW corresponds to the sound opening on the right side 23.

Furthermore, the speaker module 100C may also include an acoustic porous element 150A, and the acoustic porous element 150A may be an adjustment unit disposed in the loop tube 106, and the acoustic porous element 150A is disposed adjacent to the second sound outlet 1024. For example, the distance between the acoustic porous element 150A and the second sound outlet 1024 may be ten to twenty percent of the total length of the loop tube 106. In this embodiment, the distance between the acoustic porous element 150A and the second sound outlet 1024 is 1 to 2 mm, but it is not limited thereto.

In some embodiments, the acoustic porous element 150A is made of a material having sound-absorbing properties. For example, the acoustic porous element 150A is made of PU foam, PE foam, special rubber foam, melamine cotton, glass fiber cotton, rock wool, OFAN polyester fiber sound-absorbing cotton, melamine sound-absorbing cotton, activated carbon, or a combination thereof.

In this embodiment, the loop tube 106 is a rectangular tubular structure, and the acoustic porous element 150A is a rectangular columnar structure with a length of 2 to 5 mm. The acoustic porous element 150A conforms to the loop tube 106, which means the cross-sectional area of the acoustic porous element 150A is substantially equal to the cross-sectional area of the loop tube 106.

In the present disclosure, the cross-sectional shapes of the loop tube 106 and the acoustic porous element 150A are not limited to rectangles. For example, in other embodiments, the loop tube 106 can be a tubular structure, and the acoustic porous element 150A can be a corresponding cylindrical structure, both of which have a circular cross-section.

Finally, it should be noted that the dimensions and parameter ranges mentioned in the present disclosure are obtained based on multiple experimental results, which contribute to the sound pressure level and impedance of the speaker module 100 at low frequencies.

In conclusion, the present disclosure provides a speaker module 100, including a casing 102, a speaker unit 104 and a loop tube 106. The speaker unit 100 has a sound cavity 1021, a first sound outlet 1022 and a second sound outlet 1024. The speaker unit 104 is disposed in the casing 102, and the speaker unit 104 includes a diaphragm 1041, and the diaphragm 1041 communicates with the first sound outlet 1022. The loop tube 106 is disposed in the casing 102 and has a first end 1061 and a second end 1062. The first end 1061 communicates with the sound cavity 1021, and the second end 1062 is connected to the second sound outlet 1024. When the diaphragm 1041 vibrates, the sound emitted by the second sound outlet 1024 and the sound emitted by the first sound outlet 1022 will add to each other, thereby enhancing the bass effect of the speaker module 100.

Compared with the conventional speaker module, the speaker module of the present disclosure increases the cross-sectional area of the second sound outlet 1024 (for example, 10 to 20 $mm^2$), so that the sound pressure level and impedance at low frequencies can be improved. Furthermore, the cross-sectional areas of the second sound outlet 1024 and the loop tube 106 in the present disclosure are designed to be more than ten percent of the area of the diaphragm 1041. Based on this design, it can not only increase the sound pressure level at low frequencies, but also effectively reduce the wind noise of the speaker module.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A speaker module, comprising:

a casing, having a sound cavity, a first sound outlet and a second sound outlet; and a speaker unit, disposed in the casing, wherein the speaker unit includes a diaphragm, and the diaphragm communicates with the first sound outlet; and a loop tube, disposed in the casing, wherein the loop tube has a first end and a second end, the first end communicates with the sound cavity, and the second end communicates with the second sound outlet;

wherein a cross-sectional area of the second sound outlet and the loop tube is at least ten percent of an area of the diaphragm;

wherein a ratio of a value of the total length of the loop tube to a value of a volume of the sound cavity is 2.5~7;

wherein the volume of the sound cavity is 4 c.c. to 8 c.c., the total length of the loop tube is 20 to 30 mm, and the cross-sectional area of the loop tube is 10 to 20 $mm^2$;

wherein the speaker module further includes a first acoustic porous element which is a mesh and is attached on an outer wall surface of the casing.

2. The speaker module as claimed in claim 1, wherein the casing has a rectangular prism structure which includes a top wall, a front side wall and a side wall connected to each other, and the first sound outlet is formed by the top wall.

3. The speaker module as claimed in claim 2, wherein the loop tube is adjacent to the front side wall, and the loop tube has a uniform tubular structure extending along a long axis of the casing.

4. The speaker module as claimed in claim 3, wherein the second sound outlet is disposed on one of the top wall, the front side wall and the side wall, and the second end forms a connecting opening corresponding to the second sound outlet.

5. The speaker module as claimed in claim 2, wherein the loop tube has a uniform tubular structure and includes a first segment and a second segment, the first segment extends along a long axis of the casing, the second segment extends along a short axis of the casing, and the long axis is perpendicular to the short axis.

6. The speaker module as claimed in claim 5, wherein the first segment is adjacent to the front side wall, the second segment is adjacent to the side wall and the top wall, wherein the second sound outlet is disposed on the top wall or the side wall, and a connecting opening is formed on the second end of the second segment, corresponding to the second sound outlet.

7. The speaker module as claimed in claim 6, wherein the second sound outlet is disposed on the top wall.

8. The speaker module as claimed in claim 7, wherein the mesh is attached on the top wall.

9. The speaker module as claimed in claim 5, wherein the casing further includes a rear side wall connected to the top wall and the side wall, the first segment is adjacent to the front side wall, the second segment is adjacent to the side wall, the top wall and the rear side wall, wherein the second sound outlet is disposed on one of the top wall, the rear side wall and the side wall, and a connecting opening is formed on the second end of the second segment, corresponding to the second sound outlet.

10. The speaker module as claimed in claim 1, wherein the cross-sectional area of the loop tube is 10 to 12 $mm^2$.

11. The speaker module as claimed in claim 1, wherein the speaker module further includes a second acoustic porous element disposed in the second sound outlet.

12. The speaker module as claimed in claim 11, wherein the second acoustic porous element is an adjustment unit disposed in the loop tube, and the second acoustic porous element is disposed adjacent to the second sound outlet.

13. The speaker module as claimed in claim 12, wherein a distance between the second acoustic porous element and the second sound outlet is ten to twenty percent of the total length of the loop tube.

14. The speaker module as claimed in claim 12, wherein the second acoustic porous element is made of a material having sound-absorbing properties, which is made of PU foam, PE foam, special rubber foam, melamine cotton, glass fiber cotton, rock wool, OFAN polyester fiber sound-absorbing cotton, melamine sound-absorbing cotton, activated carbon, or a combination thereof.

* * * * *